United States Patent [19]

Collins

[11] E Patent Number: Re. 32,010

[45] Reissued Date of Patent: Oct. 22, 1985

[54] DISPENSER FOR LINER-WOUND TAPE

[75] Inventor: Philip W. Collins, Cottage Grove, Minn.

[73] Assignee: Minnesota Mining and Manufacturing Company, St. Paul, Minn.

[21] Appl. No.: 586,209

[22] Filed: Mar. 5, 1984

Related U.S. Patent Documents

Reissue of:

[64] Patent No.: 4,330,357
Issued: May 18, 1982
Appl. No.: 199,742
Filed: Oct. 23, 1980

[51] Int. Cl.[4] ..... B32B 35/00

[52] U.S. Cl. ..... 156/527; 156/577; 156/579; 156/584

[58] Field of Search ..... 156/523, 527, 540, 541, 156/574, 577, 579, 584; 221/73

[56] References Cited

U.S. PATENT DOCUMENTS

| | | | |
|---|---|---|---|
| 3,274,038 | 9/1966 | Karn | 156/247 |
| 3,283,886 | 11/1966 | Addis et al. | 206/52 |
| 3,339,797 | 9/1967 | Knutson | 221/73 |
| 3,468,743 | 9/1969 | Soriano | 156/584 |
| 3,509,000 | 4/1970 | Brown | 156/584 |
| 3,839,127 | 10/1974 | Hazuka et al. | 156/540 |
| 3,969,181 | 7/1976 | Seabold | 156/577 |
| 4,151,039 | 4/1979 | Lash | 156/584 |
| 4,220,495 | 9/1980 | Uchida | 156/577 |
| 4,336,097 | 6/1982 | Van Kampen et al. | 156/577 |
| 4,447,482 | 5/1984 | Heinzelman et al. | 156/584 |

*Primary Examiner*—Michael Wityshyn
*Attorney, Agent, or Firm*—Donald M. Sell; James A. Smith; David W. Anderson

[57] ABSTRACT

A hand held dispenser for liner wound adhesive tape having walls that define a first cavity for storing a supply roll of liner wound tape, a second cavity with an inner wall surface which causes liner pushed into the second cavity to wind into a coil, an opening through which liner may be withdrawn from the dispenser, and a other means for connecting the first cavity and the opening adapted to guide the tape being withdrawn through the opening, and for connecting the cavities to guide the liner from the first cavity into the second cavity, and for separating the liner from the tape being withdrawn so that tape being withdrawn will propel the liner along the path means and into a coil in the second cavity.

3 Claims, 9 Drawing Figures

DISPENSER FOR LINER-WOUND TAPE

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates to dispensers for use with pressure-sensitive adhesive coated rolls of tape convolutely wound with a release liner between its coils, and in particular to such dispensers which permit withdrawing the tape while effecting automatic removal and storage of the liner within the dispenser.

2. Description of the Prior Art

Pressure-sensitive adhesive coated tape packaged with a release liner to protect the adhesive surface is commonly provided in either roll form or in flat pre-cut lengths. Where such tape must be kept sterile, as for medical use, the tape is commonly supplied in flat pre-cut lengths. Such pre-cut lengths, however, may not always be the desired length for use in a particular situation, and the liner must be manually peeled from the pre-cut tape lengths, and disposed of, which is a particular disadvantage when the tape is used in an operating room. Dispensers for rolls of such tape which may be readily manufactured in a sterile condition are described in U.S. Pat. Nos. 3,274,038; 3,839,127; 3,468,743; and 3,283,886. Although the dispensers described in these patents may dispense any lengths of the tape and separate the liner from the tape, they discharge the separated liner from the dispenser where it must be manually severed and discarded. Dispensers which remove and store the liner on the dispenser as the tape is withdrawn from the dispenser are shown in U.S. Pat. Nos. 4,151,039; 3,509,000; and 3,339,797. These dispensers include a liner take-up mechanism including a take-up roll or spindle on which the liner is wound, together with a means for rotating the liner take-up roll as the tape is dispensed. Such mechanisms make these known dispensers structurally complex, however, so that they are difficult to adapt for use as a hand held dispenser, and are too expensive to be made disposable. Also, for medical use, these dispensers are too bulky for convenient sterile treatment either initially or to afford reloading of the dispenser with tape.

SUMMARY OF THE INVENTION

The present invention provides a simple hand held dispenser for pressure-sensitive adhesive coated tape wound with a release liner between its coils, in which the motion of the tape as it is withdrawn simultaneously separates the liner from the tape and winds the liner in stored condition on the dispenser without the need for a liner take-up mechanism. The dispenser is simple, sufficiently inexpensive to manufacture that it may be disposed of after a single roll of tape has been dispensed from it, and can be readily sterilized when used with tape for medical applications.

A dispenser according to the present invention comprises walls defining a first cavity for storing a supply roll of the tape, a second cavity partially defined by an inner wall surface which wall surface will cause liner pushed into the second cavity to wind into a coil, a tape outlet opening through which tape may be withdrawn from the dispenser, and a path means for connecting the first cavity and the tape outlet adapted to guide the tape through the opening, for connecting the cavities to guide the liner from the first cavity into the second cavity, and for separating the liner from the tape being withdrawn, so that tape being withdrawn propels the liner along the path means and into the second cavity.

The walls defining the dispenser may include a separating edge transverse of the path means so that the tape is peeled away from the liner around the separating edge as tape is withdrawn from the dispenser, and the liner is simultaneously pushed along the path means and into the second cavity where contact with the inner surface will cause it to wind into a coil.

The walls defining the dispenser may include a tape supporting surface projecting away from the path on the side of the opening opposite the separating edge, which tape supporting surface engages the portion of tape projecting outside the dispenser when the tape is not being withdrawn to present it in an easily accessible position for grasping by a subsequent user.

The dispenser may also provide means for affording the manual application of tension to the tape as it is withdrawn from the dispenser which can be useful in applying the tape to a surface. Such means may comprise a gap in the walls along the path between the first cavity and the opening through which gap a user may manually engage and press tape being withdrawn against the opposite wall of the path.

Preferably, the dispenser also includes tape cutting means which may be in the form of a blade having a concave cutting edge mounted externally on the dispenser to afford transversely severing the tape. Such a curved blade first cuts the two opposite outside edges of the tape, and then progressively cuts across the tape towards its center as the tape is pulled into engagement with the concave cutting edge to facilitate ease of cutting the tape.

BRIEF DESCRIPTION OF THE DRAWING

The present invention will be further described with respect to the accompanying drawing wherein like numerals refer to like parts throughout the several views and wherein.

DETAILED DESCRIPTION

Figure 1:
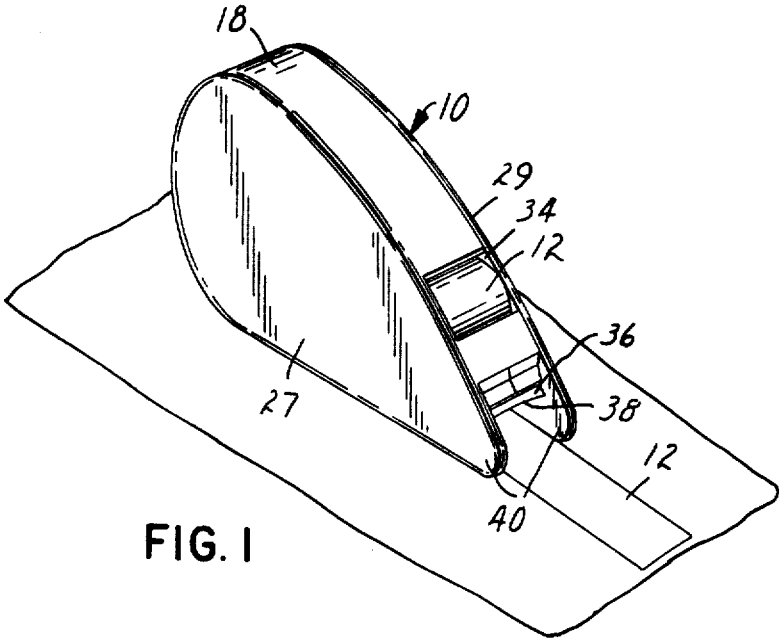
FIG. 1 is a perspective view of a first embodiment of a hand held tape dispenser according to the present invention shown during use to apply a length of tape to a surface.
Figure 2:
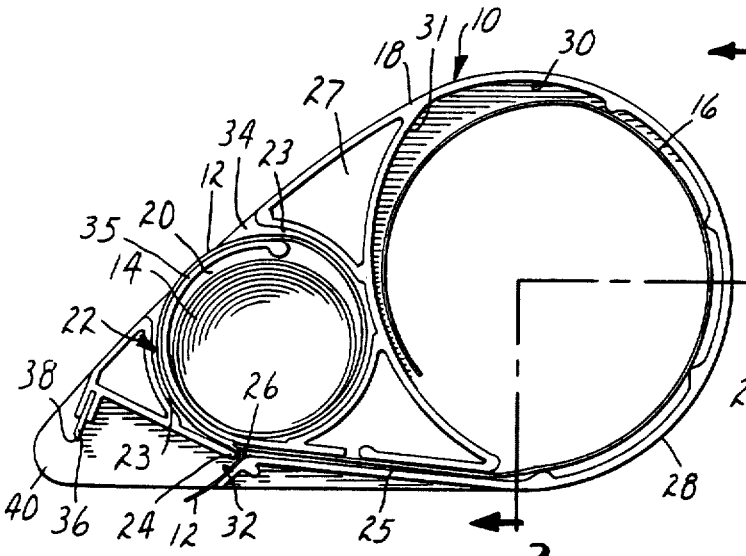
FIG. 2 is a longitudinal section view of the dispenser of FIG. 1 having inserted therein a roll of adhesive coated tape convolutely wound with a release liner.
Figure 3:
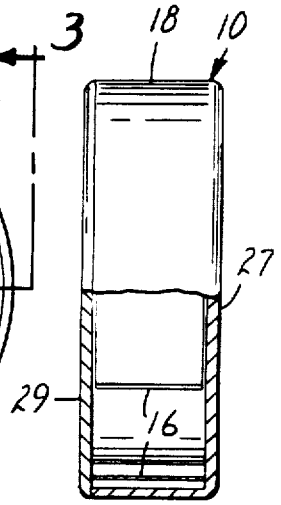
FIG. 3 is a sectional view taken approximately along line 3—3 of FIG. 2.
Figure 4:
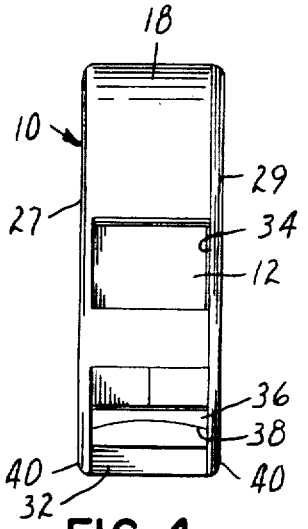
FIG. 4 is an end view of the dispenser of FIG. 1.
Figure 5:
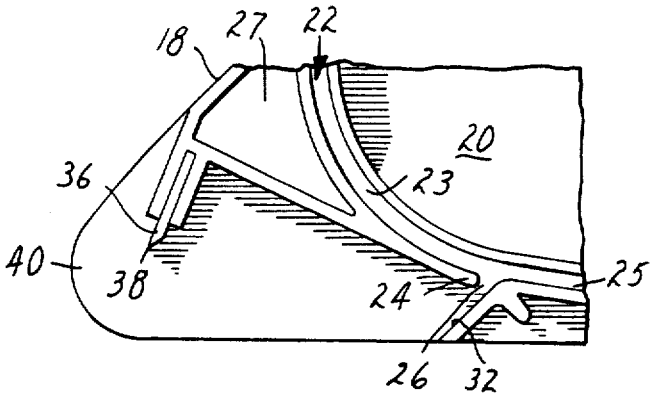
FIG. 5 is an enlarged fragmentary sectional view of the dispenser of FIG. 1 without the tape and liner, showing the opening where tape is removed from the dispenser.

Referring now to FIGS. 1 through 5 of the drawings, there is illustrated a first embodiment of a tape dispenser according to the present invention generally designated by the reference numeral 10.

The dispenser 10 is adapted to be hand held and to contain a supply roll 14 of pressure-sensitive adhesive coated tape 12 convolutely wound with a release liner 16 between coils, from which lengths of the tape 12 may be manually withdrawn through an opening 26 in the dispenser 10.

The dispenser comprises walls 18 which define a first generally cylindrical cavity 20 adapted for storing the supply roll 14; a path means or path 22 having a first portion 23 connecting the first cavity 20 and opening 26 through which the tape 12 and liner 16 may be pulled from the supply roll 14; the opening 26 through which the tape 12 may be manually withdrawn from the dispenser 10; a separating edge 24 positioned traverse of the path 22 so that as the tape 12 is pulled around the separating edge 24 through the opening 26 it will be peeled from the liner 16, while the motion of the tape 12 will simultaneously push the separated liner 16 away from the separating edge 24 along a second portion 25 of the path 22; and a second generally cylindrical cavity 30 having an arcuate inner wall surface 28 which is intersected generally at a tangent by the second portion of the path 22, such that liner 16 pushed along the second portion 25 of the path 22 will strike the arcuate inner wall surface 28 and cause the liner 16 to wind into a coil in the second cavity 30.

The curl formed in the liner 16 when it is wound with the tape in the supply roll 14 helps to cause the liner 16 to wind into a coil in the second cavity 30, since in the dispenser 10 the cavities 20 and 30 are positioned on the same side of the path 22.

The dispenser walls 18 are preferably molded of a stiff polymeric material such as high impact polystyrene. The walls 18 comprise first and second planar generally teardrop shaped side walls 27 and 29 having generally pointed end portions. The first side wall 27 has molded thereon a plurality of traverse walls 31 projecting a uniform distance normal to one major surface of the first side wall 27, and the second side wall 29 is adopted to be fastened to the distal ends of the transverse walls 31 (after the supply roll 14 of the tape 12 has been positioned in the dispenser 10) to position the second side wall 29 in opposed parallel relationship to the first side wall 27 so that arcuate portions of the transverse walls 31 and opposed generally circular portions of the side walls 27 and 29 define the generally cylindrical first and second cavities, and opposed narrow portions of the side walls 27 and 29 and portions of the traverse walls 31 define the path 22. The first cavity 20 and opening 26 are located adjacent the generally pointed end portions of the side walls 27 and 29; whereas the second cavity 30, because of its size (which is substantially larger in diameter than the first cavity 20 to facilitate coiling of the liner 16) is located at the end of the dispenser 10 opposite the generally pointed end portions of the side walls 27 and 29. The resultant shape allows the larger portion of the dispenser adjacent the larger second cavity 30 to be comfortably received in the palm of a users hand with the narrower end portion of the dispenser pointed away from his hand to afford easy access to and manipulation of tape 12 extending through the opening 26.

The traverse walls 31 further include a projecting wall defining a tape supporting surface 32 located on the side of the opening 26 opposite the separating edge 24, which supporting surface 32 is disposed at an angle with respect to the path 22 such that the portion of the tape 12 projecting out of the opening 26 (which resiliency causes the tape 12 to move toward a position parallel to the first portion of the path) will cause the tape 12 to press against and be supported by the tape supporting surface 32 in a position projecting away from the dispenser when tape 12 is not being withdrawn from the dispenser. The tape 12 so supported on the tape supporting surface 32 may be easily grasped by a subsequent user of the dispenser 10.

Means are provided for affording the manual application of tension to the tape 12 as the tape 12 is withdrawn, which is useful when affixing the tape 12 to a surface or severing tape via tape cutting means later to be explained. A gap 34 is defined by the walls 18 between the first cavity 20 and the opening 26 along the first portion 23 of the path 22, which gap 34 allows the user to manually engage the outer surface of the tape 12 and press the tape 12 and liner 16 against an arcuate portion 35 of the transverse walls 31 on the side of the first portion 23 of the path 22 opposite the gap 34 as the tape is being withdrawn through the opening [24] *26*. The user may thus control the amount of tension in the tape 12 being applied by controlling the pressure manually applied to press the tape 12 against the arcuate transverse wall portion 35.

The dispenser 10 includes tape cutting means for cutting the tape 12 when a desired length has been withdrawn. The tape cutting means comprises a blade 36 having a concave cutting edge 38 mounted on the dispenser 10 to permit transverse severing of the tape 12 after it has been pulled through the opening 26. The blade 36 is mounted perpendicularly between the opposing surfaces of outwardly projecting parts 40 of the generally pointed end portions of the two parallel side walls 27 and 29. After a desired length of the tape 12 has been pulled from the opening 26, the dispenser may be pivoted to move the blade 36 between the projecting parts 40 toward the tape after movement of tape out of the dispenser is stopped by manually pressing the tape against the wall portion 35 through the [opening 24] *gap 34*. As the concave cutting edge 38 is moved into engagement with the tape 12, the tape 12 will be severed transversely from its opposite outside edges progressively towards its center to facilitate ease of severing of the tape 12.

For operation, the supply roll 14 is loaded into the first cavity 20 and the tape 12 and liner 16 [and] *are* separated adjacent their ends and threaded along the first portion 23 of the path with the separated end of the tape 12 projecting out of the opening 26 and the separated end of the liner 16 in the second portion 25 of the path 22 leading to the second cavity 30. The dispenser 10 is then closed by attachment of the second side wall 29, whereupon a user may grasp the dispenser 10 with one hand, and grasp and pull out the desired length of tape 12 with the other hand. As the tape 12 is pulled out of the dispenser 10, the liner 16 is separated at the separating edge 24 and is pushed along the second portion 25 of the path 22 into the second cavity 30 where contact with the arcuate wall surface 28 causes it to form a coil. The second side wall may be releasably attached to the transverse walls 31 as by screws or hooks so that when the tape 12 has all been dispensed the liner 16 may be removed from the second cavity 30 and a new supply roll 14 loaded into the first cavity 20 and threaded along the path 22. Alternatively, because dispenser 10 is simple, it may be economically manufactured so that the second side wall 29 is not removable and the dispenser is disposed of after a single roll of tape 12 is dispensed. Also in either form since the dispenser 10 is compact and simple in structure, the dispenser may be readily sterilized prior to use.

Figure 6:
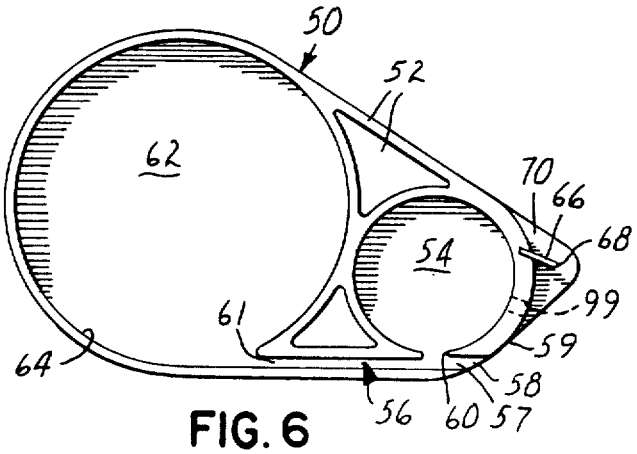
FIG. 6 is a longitudinal section view of a second embodiment of a dispenser according to the present invention.
Figure 7:
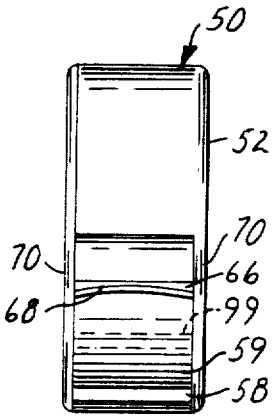
FIG. 7 is an end view of the dispenser of FIG. 6.

Referring to FIGS. 6 and 7 of the drawings, there is illustrated a second embodiment of a tape dispenser according to the present invention generally designated by the reference numeral 50.

The dispenser 50 comprises walls 52 which define a first generally cylindrical cavity 54 adapted for storing a supply roll of tape convolutely wound with a release liner between its coils; a path means or path 56 comprising a portion 57 connecting the first cavity 54 with an outlet opening 58 through which tape may be manually withdrawn from a supply roll (not shown) in the first cavity 54; a separating edge 60 positioned traverse of the path [54] *56* at the first cavity 54 so that as the tape is pulled around the separating edge 60 along the path portion 57 and through the opening 58 it will be peeled from the liner while the motion of the tape will simultaneously push the separated liner away from the separating edge 60 along a second portion 61 of the path 56; and a second generally cylindrical cavity 62 having an arcuate inner wall surface 64 which is intersected generally at a tangent by the path 56, such that liner pushed along the second portion 61 of the path 56 into the second cavity 62 will strike the arcuate inner wall surface 64 and cause the liner to wind into a coil in the second cavity 62.

Like the dispenser 10, the dispenser 50 includes a tape cutting means for cutting the tape when a desired length has been withdrawn, comprising a blade 66 having a concave cutting edge 68 mounted on the dispenser 50 between projecting opposed parts 70 of planar generally teardrop shaped side walls of the dispenser 50 to permit transverse severing of the tape after it has been pulled through the opening 58.

Unlike the dispenser 10, however, the dispenser 50 further includes a means for pressing the tape as it is withdrawn through the opening 58, comprising an outer arcuate surface 59 defined by the walls 52.

Figure 8:
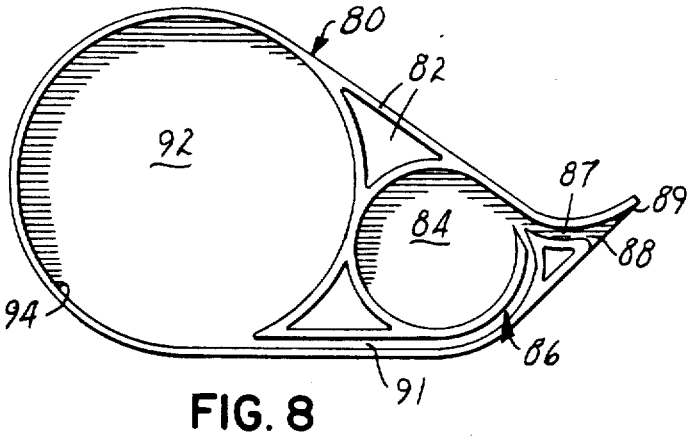
FIG. 8 is a longitudinal section of a third embodiment of a dispenser according to this invention.
Figure 9:
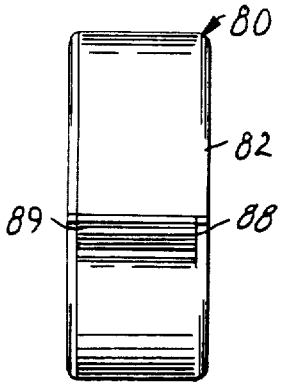
FIG. 9 is an end view of the dispenser of FIG. 8.

Referring to FIGS. 8 and 9 of the drawings, there is illustrated a third embodiment of a tape dispenser according to the present invention generally designated by the reference numeral 80.

The dispenser 80 comprises walls 82 which define a first generally cylindrical cavity 84 adapted for storing a supply roll of tape convolutely wound with a release liner between its coils; a second generally cylindrical cavity 92 having an arcuate inner wall surface 94 adapted to direct liner pushed into the second cavity 92 to wind into a coil; a tape outlet opening 88 through which tape may be withdrawn from the dispenser 80; and a path means or path 86 including a portion 87 for connecting the first cavity 84 and the opening 88 to guide tape being withdrawn from the dispenser 80 through the opening 88, and a portion 91 for connecting the cavities 84 and 92 to guide liner from the first cavity 84 into the second cavity 92 where the liner will strike the inner wall surface 94 of the second cavity 92 which will cause the liner to wind into a coil. The path portions 87 and 91 diverge at an edge 90 which divergence (and not the edge 90) provides means for separating the liner from tape being withdrawn through the path portion 87 so that tape being withdrawn will propel the liner along the path portion 91 and into the second cavity 92. The use of such divergent path portions 87 and 91 works well to separate tape and liner where the liner has sufficient stiffness and the pressure sensitive adhesive on the tape does not adhere too aggressively to the liner. Where the liner is not sufficiently stiff or the adhesive is too aggressive, the liner can fold and follow the tape out the path portion 87. It has been found that separating a tape from a liner by peeling the tape away from the liner around an edge, such as is done around the edges 24 and 60 in the dispensers 10 and 50 respectively, affords dispensing tape wound on liner having less stiffness or tape having more aggressive adhesive than does separating the tape from the liner via diverging paths.

Like the dispenser 50, the dispenser 80 includes a means for pressing the tape as it is withdrawn through the opening 88, comprising an outer arcuate surface 89 defined by the walls 82.

The present invention has now been described with reference to three embodiments thereof, and it will be appreciated by those skilled in the art that many changes can be made in the shapes and features of the dispenser illustrated without departing from the spirit of the invention. For example, in the dispenser 50 of FIG. 6, the path portions 57 and 61 can be separated so that the path portion 57 communicates with the cavity 54 at a position spaced from the position at which the path portion 61 communicates with the first cavity 54 (such as is illustrated by the dotted lines 99) so that the liner after it is separated from the tape moves a short distance along the inner surface of the cavity 54 and then along the second path portion 61 into the second cavity 62. Also, with the general shape of the dispenser 50 as illustrated, the supply roll of tape may be loaded into the cavity 62 and the liner collected in the cavity 54 as the tape ispulled along the path 56 and through the outlet opening 58, preferably after the relative size of the cavities 62 and 54 has been reversed. Thus, the scope of the present invention should not be limited by the structures of the dispensers described, but only by the language of the dependent claims.

I claim:

1. A hand-held dispenser by which lengths of pressure-sensitive adhesive coated tape may be withdrawn from a supply roll of said tape convolutely wound with a release liner between its coils, said dispenser comprising walls defining:

a first cavity adapted for storing said supply roll;

a second cavity adapted for storing said liner, said second cavity being partially defined by an inner wall surface adapted to direct liner pushed into said second cavity to wind into a coil;

a tape outlet opening; and path means for connecting said first cavity and said outlet opening adapted to guide tape being withdrawn from said dispenser through said opening, for connecting said cavities to guide said liner from said first cavity into said second cavity, and for separating said liner from tape being withdrawn from said opening so that tape being withdrawn from said opening will propel said liner along said path means and into a coil in said second cavity.

2. A dispenser according to claim 1 wherein said cavities are generally cylindrical.

*3. A hand-held dispenser by which lengths of pressure-sensitive adhesive coated tape may be withdrawn from a supply roll of said tape convolutely wound with a release liner between its coils, said dispenser comprising walls defining:*

*a first cavity adapted for storing said supply roll;*

*a second cavity adapted for storing said liner;*

*a tape outlet opening communicating with said first cavity; and*

*path means for connecting said cavities to guide said liner from said first cavity into said second cavity and for separating said liner from tape being withdrawn from said opening to that tape being withdrawn from said opening will propel said liner along said path means and into said second cavity.*

* * * * *